United States Patent
Akiyama

(10) Patent No.: US 6,327,076 B1
(45) Date of Patent: Dec. 4, 2001

(54) OPTICAL AMPLIFIER EQUIPMENT FOR WDM OPTICAL COMMUNICATION

(75) Inventor: Koichi Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/549,629

(22) Filed: Apr. 14, 2000

(30) Foreign Application Priority Data

Apr. 16, 1999 (JP) .................................................. 11/109560

(51) Int. Cl.[7] ........................................................ H01S 3/00
(52) U.S. Cl. ................................. 359/337.11; 359/341.4
(58) Field of Search ............................. 359/341.4, 341.42, 359/341.41, 337.11

(56) References Cited

U.S. PATENT DOCUMENTS 5,818,629 * 10/1998 Kinoshita .............................. 359/341
6,057,959 * 5/2000 Taylor et al. ......................... 359/341

* cited by examiner

*Primary Examiner*—Mark Hellner
(74) *Attorney, Agent, or Firm*—Ostrolenk, Faber, Gerb & Soffen, LLP

(57) ABSTRACT

To provide an optical amplifier which optically amplifies inputted WDM light and outputs the amplified signal light, and a control circuit of an optical branching unit and an optical output level detector and an optical amplifier, which optically branches part of the amplified signal light and monitors the light and controls the gain of the optical amplifier and controls the optical output level of the amplified signal light so that it may be constant. Furthermore, there is provided a quasi-signal WDM which wavelength-division-multiplexes the first and second quasi-signal lights having a wavelength shorter than the wavelength band of the WDM light and a wavelength longer than that with the WDM light and which puts the light in the optical amplifier. On the output side of the optical amplifier, an wavelength division multiplexer is arranged, and a first amplified quasi-signal light and a second amplified quasi-signal light are taken out of the amplified signal light respectively, and optical output levels thereof are detected, and the attenuation amount of a variable attenuator is controlled so that the levels of both may be approximately the same, and the gain of the optical amplification imposed on the optical amplifier is controlled. The optical amplification can be performed in the state where the degradation of the gain flatness of the optical amplifier itself caused by the change of the ambient temperature or the like is prevented and the gain uniformity between each signal light of the WDM light is kept.

38 Claims, 9 Drawing Sheets

OUTPUT LIGHT POWER:ZOUTPUT
OUTPUT SET VALUE:$Z_0$

QUASI-SIGNAL LIGHT(SHORT WAVE SIDE) POWER:$Y_S$
QUASI-SIGNAL LIGHT(LONG WAVE SIDE) POWER:$Y_L$
QUASI-SIGNAL LIGHT OUTPUT SET VALUE(Min):Ymin
QUASI-SIGNAL LIGHT OUTPUT SET VALUE(Max): Ymax

OPTICAL AMPLIFIER EQUIPMENT FOR WDM OPTICAL COMMUNICATION

BACKGROUND OF THE INVENTION

1. Field of the Invention

The present invention relates to optical amplifier equipment used for wavelangth division multiplexing (WDM) optical communication, and more particularly, relates to optical amplifier equipment for WDM optical communication which has a high degree of flatness in a gain of a signal light of each wavelength.

2. Description of Related Art

A WDM optical communication system which wavelength-division-multiplexes a plurality of signal lights with mutually different wavelengths and optically communicates them is widely used, since it can increase the communication capacity. In the WDM optical communication system, optical amplifier equipment is also applied for the purpose of extending the communication distance or the like.

As the optical amplifier equipment, for example, erbium doped fiber optical amplifier equipment (EDFA) is well known, in which an erbium doped optical fiber to which erbium is doped is used as the optical fiber to be an amplifying medium. Optical fiber amplifier equipment is normally configured by a pumping light source which outputs pumping light and a WDM which wavelength-division-multiplexes the pumping light with the signal light and which puts them into an amplifying optical fiber, besides an optical fiber to be an amplifying medium.

As conventional optical amplifier equipment for WDM optical communication, for example, optical fiber amplifier equipment is well known, which is configured by a two-stage optical fiber amplifier using pumping light with a wavelength of the 980 nm band at the front stage and using pumping light with a wavelength of the 1480 nm band at the rear stage for simultaneously attaining low noise and high power. A description will be given by taking such a configuration as an example. In order to finally flatten the gain for each signal light of the wavelength-division-multiplexed signal light (hereafter, referred to simply as "WDM light") outputted from the optical fiber amplifier equipment, a gain equalizer is arranged between a front stage optical fiber amplifier and a rear stage optical fiber amplifier.

The gain equalizer is an optical part having a wavelength characteristic of loss which is the reverse of the wavelength characteristic of gain of the optical fiber amplifier. Therefore, the branched output light is received by a monitor PD, and by controlling a pumping light source so that the output light may be constant, the control is performed so that the gain of the optical fiber amplifier may be kept constant.

However, since the wavelength characteristic of the gain of the optical fiber amplifier changes depending on the gain value, the optimized gain flatness can be established only at one point of a certain gain value. Therefore, there is a probability that the gain flatness may not be kept when the loss of an optical part configuring the optical fiber amplifier changes with the environmental temperature.

That is, even if the wavelength characteristic of the gain of an optical fiber amplifier is flattened through the total of the wavelength band of the signal light at a certain specific gain value, for example, a gain of +10 dB, the gain for light with a short wavelength may relatively be higher than that for light with a long wavelength, or the reverse thereof may occur. In any case, the gain is different depending on the wavelength, and the flatness cannot be kept.

Such a fact does not matter when the optical amplification is performed by a gain at which the flatness is previously compensated, for example, in the case where the optical amplifying control is performed so that the optical output level of the amplified signal light may be kept constant, but it may occur when the optical input level of the inputted signal light is lowered and a higher gain is required for still keeping the optical output level constant.

As one means for avoiding the above described problem, it is also considered to control the optical input level of signal light inputted into the optical fiber amplifier equipment so that the optical output level may be a certain constant value and it may be a gain at which the flatness of the gain of the optical fiber amplifier can be attained.

However, even if the control is performed so that the optical input level of such signal light may be a specified value, it is difficult to keep the flatness of the gain of the optical fiber amplifier, for example, because of the loss fluctuation of the optical part itself configuring the amplifier which is caused by the change of the ambient temperature of the optical fiber amplifier, or various other factors. Finally, it is difficult to keep the flatness of the optical output level of each signal light in the amplified WDM light.

SUMMARY OF THE INVENTION

It is an object of the optical amplifier equipment for WDM optical communication of the present invention to prevent the degradation of the gain flatness caused by the change of the ambient temperature of the optical amplifier equipment or the like which is worrisome in the case where an optical fiber amplifier is applied to the WDM optical communication as it is, and to make it possible to perform the optical amplification in the state where the gain uniformity is kept in each signal light.

The Optical amplifier equipment for WDM optical communication of the present invention has, as the basic configuration, an optical amplifier which optically amplifies the inputted WDM light and outputs the amplified signal light, and a control circuit of an optical branching unit and an optical output level detector and an optical amplifier, which optically branches part of the amplified signal light and monitors the light and controls the gain of the optical amplifier and controls the optical output level of the amplified signal light so that it may be constant.

In addition to the above described configuration, on the input side of a first optical amplifier, a WDM which wavelength-division-multiplexes two following quasi-signal lights is arranged, and a first quasi-signal light and a second signal light which have wavelengths different from the wavelength of the signal light and have mutually different wavelengths are wavelength-division-multiplexed with the above described WDM light to be inputted into the first optical amplifier. On the output side of the optical amplifier, an wavelength division multiplexer is arranged, and the configuration is made such that a first amplified quasi-signal light (hereafter, referred to as "first post-amplification quasi-signal light") and a second amplified quasi-signal light (hereafter, referred to as "second post-amplification quasi-signal light") are taken out from among the amplified signal light respectively.

The optical output levels of the first and second branched post-amplification quasi-signal lights are detected, and the gain of the optical amplification imposed on the optical amplifier is controlled so that the levels of both may be approximately the same or may be within the previously determined range. That is, the ratio of the set optical output levels is controlled so that the output level to the optical input level of the inputted WDM light may be constant. Preferably, in order that the quasi-signal light is transmitted in the same direction as the signal light, a quasi-signal WDM should be arranged on the input side of the optical amplifier, and the WDM should be arranged on the output side. However, it is also possible to make the quasi-signal light travel in the opposite direction of the direction of the signal light.

The wavelengths of the first and second quasi-signal lights should basically be different from the wavelength of the original signal light, and the wavelengths of both should mutually be different. However, in the case where all wavelengths of the original signal light are close and the wavelength band occupied by the total of the WDM light is narrow, as for the wavelengths of the first and second quasi-signal lights, one quasi-signal light should have a wavelength shorter than that of the wavelength band occupied by the WDM light, and the other should have a longer wavelength. On the other hand, in the case where the wavelengths of the wavelength-division-multiplexed signal light are separated, for example, in the case of the band of 1.3 $\mu$m and 1.55 $\mu$m, it is also possible that either or both have wavelengths between those of both signal lights.

In case of the above described configuration, a difference between both signal lights after the amplification is calculated by using two quasi-signal lights, so that the attenuation amount for the WDM light may be controlled. In the case where the correlation between the optical output level of the amplified quasi-signal light and the attenuation amount to be given to the WDM light is known in advance, it is also possible to feedback-control the attenuation amount only by one quasi-signal light.

Next, as for the optical amplifier equipment for WDM optical communication of the present invention, the more particular configuration and operation, and the basic principle and the derivative application form will be described.

As for means for solving the above described problems to be solved, more particularly, the optical amplifier of the present invention includes a first optical amplifier into which the WDM light made by wavelength-division-multiplexing a plurality of signal lights having mutually different wavelengths is inputted and which optically amplifies this WDM light to output the amplified WDM light, and an optical branching unit which branches part of the amplified WDM light. The first optical amplifier is controlled so that the amplified WDM light branched by the optical branching unit may be monitored and so that the optical output level of the amplified WDM light may be kept at the optical output level of a previously determined value (hereafter, referred to as "reference optical output level") by the optical output level detector circuit.

In addition to the above described configuration, a quasi-signal light WDM is arranged on the input side of the first optical amplifier, and by the quasi-signal light WDM, a first quasi-signal light with a wavelength shorter than that of the signal light with the shortest wavelength among the signal light and a second quasi-signal light with a wavelength longer than that of the signal light with the longest wavelength are wavelength-division-multiplexed with the WDM light as the quasi-signal light to be inputted into the first optical amplifier. A quasi-signal light detector circuit is arranged on the output side of the first optical amplifier, and from the WDM light amplified by the first optical amplifier, a first amplified quasi-signal light (hereafter, referred to as "first post-amplification quasi-signal light") and a second amplified quasi-signal light (hereafter, referred to as "second post-amplification quasi-signal light") are taken out. The optical output levels of both quasi-signal lights are detected respectively, and the first and second quasi-signal light levels are outputted. A difference between the first and second post-amplification quasi-signal light levels is calculated, and the attenuation amount determined based on this difference is given to the WDM light by a variable optical attenuator.

This control can be performed, for example, by the variable optical attenuator arranged in the optical communication passage. That is, the optical output level of the amplified signal light is set, and the control is performed so that this optical output level may be constant, and the standard attenuation amount is given in advance to the variable optical attenuator so that the gain flatness of the optical amplifier may be the compensated gain. In the case where the optical input level of the inputted WDM light is lowered and the total gain is high for still keeping the optical output level, the attenuation amount of the variable optical attenuator should be lowered so that the gain of the optical amplification imposed on the optical amplifier may not deviate from the gain at which the initial gain flatness is assured. On the contrary, in the case where the optical input level becomes high, the required gain becomes small, and therefore, the control is performed so that the attenuation amount of the variable optical attenuator may become large for correcting this. The optical amplifier equipment for WDM optical communication of the present invention performs these changes by using the first and second quasi-signal lights and by monitoring the difference between the optical output levels of both post-amplification quasi-signals.

Since the variable optical attenuator functions to change the gain of the optical amplifier after monitoring the optical output level, it may be arranged on whichever of the input side and the output side of the optical amplifier as long as it is positioned at the front stage of the optical branching unit for monitoring the optical output level. However, if possible, in order that the original WDM light is attenuated before being optically amplified and the degradation of the signal-to-noise ratio is not caused, it is preferable to be arranged between the optical amplifier and the optical branching unit for monitoring the optical output level.

On the other hand, the wavelength division multiplexer which performs branching for monitoring the first and second post-amplification quasi-signal lights has an object to monitor the state after the optical amplification. Therefore, it may be arranged wherever as long as it exists on the output side of the optical amplifier, and it may be arranged at whichever of the front or rear stage of the variable optical attenuator, or the front or rear stage of the optical branching unit. However, from the viewpoint of detecting only the optical output level of the original WDM light when monitoring the optical output level, it is preferable that it is arranged at the front stage of the optical branching unit to remove both post-amplification quasi-signal lights here.

The above description has been given as for the case where the optical amplifier equipment is configured only by a single optical amplifier (hereafter, referred to as "first optical amplifier" in contrast with "second optical amplifier"), but it may have a configuration where a plurality of optical amplifiers are arranged in a multistage way and in series. For example, a configuration similar to the above described configuration, that is, a configuration where the first and second quasi-signal lights are wavelength-division-multiplexed and they are branched after the optical amplification and the attenuation amount is given on the basis of the difference between both can also be applied to the optical amplifier equipment with the two-stage configuration in which a second optical amplifier is further connected in series at the front stage of a first optical amplifier. Herein, in case of a multistage configuration, especially, the wavelength dependence of the gain is overlapped, and therefore, a gain equalizer can be used for obtaining the flatness. The gain equalizer used here has a function to gain-equalize each signal light so that the gain for each signal light included in the amplified WDM light may be uniform, in the case where the gain of the amplified WDM light optically amplified by the first optical amplifier is a gain of a previously determined value (hereafter, referred to as "reference gain").

However, even in this case, if a level fluctuation occurs in the inputted WDM light, the problem described in the subject matter still occurs, and therefore, the gain flatness can be improved by applying the above described configuration of the present invention. In the configuration where a gain equalizer is arranged in a single optical amplifier, the gain flatness can also be improved by the present invention. This gain equalizer may be arranged on the input side of the first optical amplifier, or it may be arranged on the output side. Or, in case of optical amplifiers of the two-stage configuration, it may be arranged between both optical amplifiers.

In the above described configuration where the attenuation amount is given so that the gain of the optical amplifier may be constant by monitoring the levels of the first and second quasi-signal lights, the attenuation amount to be given is set so that the gain at the time when the WDM light .is optically amplified to the reference optical output level by the first optical amplifier may be the reference gain when the WDM light of a previously determined level is inputted into the optical amplifier equipment for WDM optical communication (hereafter, referred to as "when receiving the standard level." At the time of receiving the standard level, the attenuation amount should be set at an attenuation amount of a previously determined value (hereafter, referred to as "standard attenuation amount"). In this case, in optical amplifiers of the two-stage configuration, the setting is performed so that the gain at the time when the WDM light is optically amplified to the reference optical output level by the first optical amplifier and the second optical amplifier may be the reference gain when receiving the standard level. Together with this, the attenuation amount should be set to the standard attenuation amount at the time of receiving the standard level.

Or, the setting should be performed so that the gain at the time when the WDM light is optically amplified to the reference optical output level by the first optical amplifier may be the reference gain when the WDM light of the minimum level is inputted into the optical amplifier equipment for WDM optical communication (hereafter, referred to as "when receiving the minimum level"), and the setting should be performed so that the attenuation amount may be zero at the time of receiving the minimum level. Herein, in case of optical amplifiers of the two-stage configuration, the setting should be performed so that the gain at the time when the WDM light is optically amplified to the reference optical output level by the first optical amplifier and the second optical amplifier may be the reference gain at the time of receiving the minimum level, and the setting should be performed so that the attenuation amount may be zero at the time of receiving the minimum level. However, according to such a configuration, in the case where the internal loss of the optical amplifier itself is increased because of the aging or the like, it is impossible to deal with the situation by reducing the attenuation amount, and accordingly, the above described configuration is more excellent from this viewpoint.

The first and second optical amplifiers used in the optical amplifier equipment for WDM optical communication of the present invention are optical fiber amplifiers, respectively. That is, the first optical amplifier is an optical amplifier having a first amplifying optical fiber to be an amplifying medium of the WDM light, a first pumping light source for outputting a first pumping light, and a first pumping light WDM which wavelength-division-multiplexes the first pumping light and inputs it into the first amplifying optical fiber. In case of such a configuration, the optical output level control circuit includes a first pumping light output control circuit for controlling the optical output level of the first pumping light.

The optical amplifier equipment of the present invention compensates the wavelength dependence of the gain produced by the fluctuation of the gain itself included in the optical amplifier. Accordingly, it can be applied not only to an optical fiber amplifier but also to amplifiers in which such a problem occurs, for example, an optical amplifier configured by a semiconductor optical amplifier element. In this case, the optical output level control circuit includes a first injection current control circuit for controlling the gain of the first semiconductor optical amplifier element so that it may be constant.

Herein, the optical amplifier may have the two-stage configuration, but in this case, for example, the second optical amplifier arranged at the front stage of the first optical amplifier should be controlled so that the pumping light may be constant.

The above described quasi-signal light WDM and quasi-signal light detector circuit used in the optical amplifier equipment of the present invention can be realized by various configurations.

First, the quasi-signal light WDM may have a first WDM and a second WDM which wavelength-division-multiplex a quasi-signal light and a second quasi-signal light with the WDM light respectively, besides a first quasi-signal light source and a second quasi-signal light source which output the first and second quasi-signal lights respectively. It is also possible that in addition to the first and second light sources, first, the first and second quasi-signal lights are wavelength-division-multiplex by a third WDM to output the multiplexed quasi-signal light and this multiplexed quasi-signal light is wavelength-division-multiplexed with the WDM light by a fourth WDM.

Furthermore, as another form, a first optical circulator is arranged in the communication passage, which puts in the light outputted from the third WDM in the opposite direction of the traveling direction of the WDM light and which passes the light traveling in the same direction as the WDM light toward the first optical amplifier, after the first and second quasi-signal lights have been wavelength-division-multiplexed by the third WDM and the multiplexed quasi-signal lights have been outputted. Furthermore, a quasi-signal light reflector may be arranged, which reflects only a first light with the same wavelength as the first quasi-signal light and a second light with the same wavelength as the second quasi-signal light among the light outputted from the third WDM and traveling in the opposite direction of the WDM light, and which passes the residual light.

The quasi-signal light reflector can be configured by a first fiber grating which reflects only the first light and passes the residual light and a second fiber grating which is connected in series to the first fiber grating and which reflects only the second light and passes the residual light. A configuration like this is suitable in the case where the wavelength of the quasi-signal light is set to be close to the wavelength of the original signal light, or in the case where the light with a wavelength of a narrow band is used for the quasi-signal light. It is also possible to connect two fiber gratings in series. It is also possible to use a long period fiber grating (chirped fiber grating) which reflects only both quasi-signal lights at the same time and which passes the WDM light.

On the other hand, the post-amplification quasi-signal light detector circuit can be configured by a first wavelength division multiplexer and a second wavelength division multiplexer which branch the first and second post-amplification quasi-signal lights from the post-amplification WDM light respectively, and a first optical receiver and a second optical receiver which detect levels of the first and second branched post-amplification quasi-signal lights respectively. It is also possible that the first and second post-amplification quasi-signal lights are branched and taken out of the amplified WDM light and both the first and second branched post-amplification quasi-signal lights are further branched into the first post-amplification quasi-signal light and the second post-amplification quasi-signal light.

Or, as another form, the post-amplification quasi-signal light detector circuit can also be configured by an optical circulator and a fiber grating. It can also be configured by a second optical circulator which is an optical circulator having the four-port input-output terminal from a first port to a fourth port for outputting the inputted light to the next port in turn from the first port to the fourth port and in which the first port is connected to the output side of the first optical amplifier and the second port is connected to the above described optical branching unit, a post-amplification quasi-signal light reflector which is arranged between the second port and the optical branching unit and which reflects only the first and second post-amplification quasi-signal lights, a third fiber grating which is connected to the third port and which passes only either the first post-amplification quasi-signal light or the second post-amplification quasi-signal light and reflects the other, a third optical receiver which detects the level of the light passing through the fiber grating, and a fourth optical receiver which detects the level of the light outputted from the fourth port. The above described post-amplification quasi-signal light reflector can be configured by a fourth fiber grating which reflects only the first post-amplification quasi-signal light and passes the residual light and a fifth fiber grating which is connected to the fourth fiber grating in series and which reflects only the second post-amplification quasi-signal light and passes residual light.

BRIEF DESCRIPTION OF THE DRAWINGS

The above and other objects, features, and advantages of the present invention will become more apparent from the following detailed description when taken in conjunction with the accompanying drawings wherein.

DETAILED DESCRIPTION OF THE PREFERRED EMBODIMENTS:

First of all, before describing optical amplifier equipment of the present invention, conventional optical amplifier equipment will be described for making it easy to understand the invention.

Figure 1:
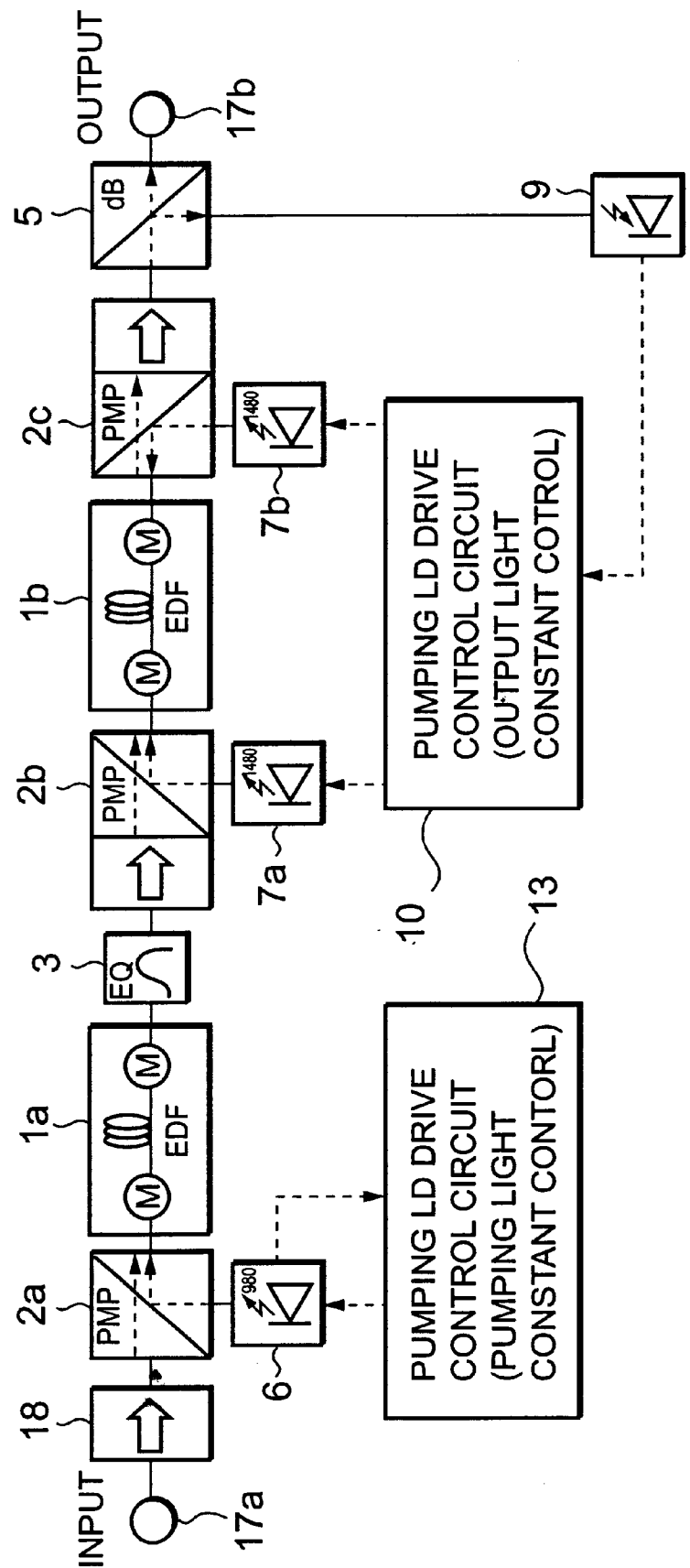
FIG. 1 is a view showing one example of the configuration of conventional optical amplifier equipment for WDM optical communication.

FIG. 1 is a view showing one example of the configuration of conventional optical amplifier equipment for WDM optical communication. In the present example, optical fiber amplifier equipment is shown, which is configured by two stages: a front stage of 980 nm band pumping and a rear stage of 1480 nm band pumping for realizing low noise and high power at the same time. In order to finally flatten the gain for each signal light of the wavelength-division-multiplexed signal light (hereafter, referred to as "WDM light") outputted from the optical fiber amplifier equipment, a gain equalizer is arranged between a front stage optical fiber amplifier and a rear stage optical fiber amplifier.

This gain equalizer is an optical part having a wavelength characteristic of loss which is the reverse of the wavelength characteristic of gain of the optical fiber amplifier. Therefore, the branched output light is received by a monitor PD and the pumping light source is controlled so that the output light may be constant, and consequently, the control is performed so that the gain of the optical fiber amplifier may be kept constant.

However, since the wavelength characteristic of the gain of the optical fiber amplifier changes depending on the gain value, the optimized gain flatness can also be established only at one point of a certain gain value. Therefore, there is a provability that the gain flatness cannot be kept when the loss of an optical part configuring the optical fiber amplifier changes depending on the environmental temperature.

That is, even when the wavelength characteristic of the gain of the optical fiber amplifier is flattened through the total of the wavelength band of the signal light at a certain specific gain value, for example, a gain of +10 dB, the gain for light with a short wavelength may become relatively higher than that for light with a long wavelength, or the reverse thereof may occurs, in the above described case where the gain changes. In any case, the gain is different depending on the wavelength, and the flatness cannot be kept.

Such a fact does not matter when the optical amplification is performed at the gain where the flatness is assured in advance, for example, in the case where the optical amplification control is performed so that the optical output level of the amplified signal light may be kept constant, but the fact may occur when the optical input level of the inputted signal light is lowered and still a high gain is required to keep the optical output level constant.

Next, the configuration of optical fiber amplifier equipment for WDM optical communication of the present invention will be described below in detail by referring to drawings.

Figure 2:
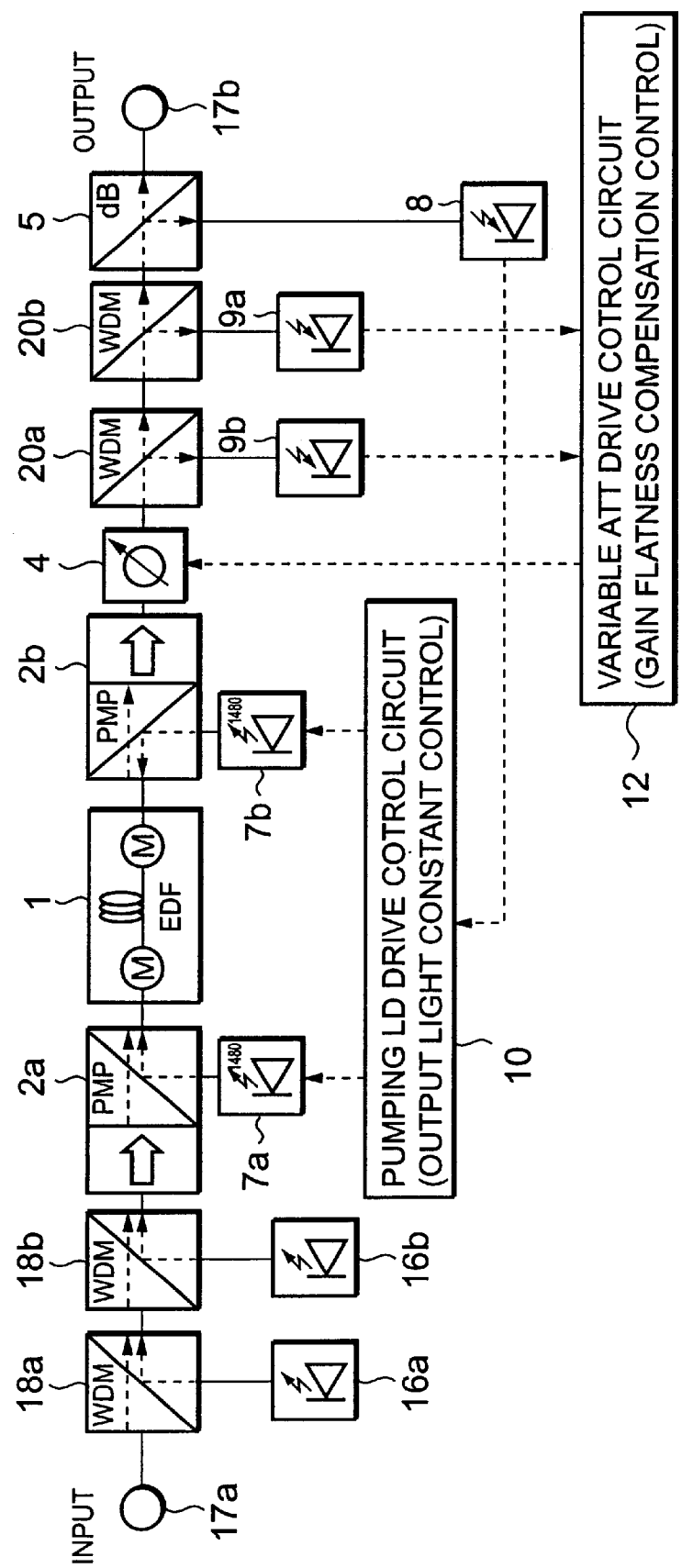
FIG. 2 is a view showing the configuration of a first embodiment of the optical amplifier equipment for WDM optical communication of the present invention.

Optical amplifier equipment of the present invention is based on the assumption that the WDM light in which signal lights with mutually different wavelengths are wavelength-division-multiplexed is collectively optically amplified. FIG. 2 is a view showing the configuration of a first embodiment of optical amplifier equipment for WDM optical communication of the present invention. The optical amplifier equipment of a first embodiment of the present invention shown in FIG. 2 shows the basic configuration in the case where only one optical amplifier for optically amplifying the WDM light is provided.

First, the basic configuration of optical amplifier equipment of the present invention will be described. As shown in FIG. 2, it has an optical amplifier which collectively optically amplifies the WDM light and an output control circuit which monitors the optical output level of the amplified WDM light outputted from this optical amplifier (hereafter, referred to as "amplified WDM light") and which performs the optical output control of the optical amplifier so that the optical output level may be kept at the previously determined optical output level.

In the present embodiment, a description will be given by taking an optical fiber amplifier which uses an erbium doped optical fiber 1 (EDF) as an amplifying medium for the optical amplifier, as an example. Herein, in the description of a second embodiment and afterward, all the description will be given by taking an optical fiber amplifier as an example for the optical amplifier. Not limited to this, it can also be applied to other kinds of optical amplifiers, for example, a semiconductor optical amplifier, if the amplifier is an amplifier in which the wavelength dependence of the gain changes with the gain fluctuation.

The optical fiber amplifier used in the present embodiment has two pumping light sources 7a, 7b which output pumping light and WDMs 2a, 2b which put the pumping light outputted from these into the erbium doped optical fiber 1, besides the erbium doped optical fiber 1 to be an amplifying medium. On the input and output sides of the erbium doped optical fiber 1, optical isolators are arranged for preventing the traveling of light in the reverse direction, respectively.

In the case of the above described configuration, a difference between both signal lights after the amplification is calculated by using two quasi-signal lights to control the attenuation amount for the WDM light. In the case where the correlation between the optical output level of the amplified quasi-signal light and the attenuation amount to be given to the WDM light is previously known, it is also possible to feedback-control the attenuation amount only by one quasi-signal light.

On the other hand, on the output side of the optical fiber amplifier, an optical branching unit 5 is arranged, and part of the amplified WDM light is branched and by an optical receiver 8, it is converted into an electric signal and the optical output level thereof is detected. The optical fiber amplifier is controlled so that the optical output level may be a previously determined constant value. In the case of the present embodiment, a pumping light source (pumping LD) drive control circuit 10 is arranged, and the optical output control is performed by controlling the injection current to the pumping light source (pumping LD) according to the above described detected optical output level. In the present embodiment, the configuration of the two-way pumping light in which the pumping light is put in from both of the forward and backward of the erbium optical fiber 1 is shown, but it is also possible to put in the pumping light from either the forward or the backward. As mentioned above, in the case where a semiconductor optical amplifier is used for the optical amplifier, it is sufficient to control the injection current to the semiconductor optical amplifier element.

In the case of the above described configuration, a difference between both signal lights after the amplification is calculated by using two quasi-signal lights to control the attenuation amount for the WDM light. In the case where the correlation between the optical output level of the amplified quasi-signal light and the attenuation amount to be given to the WDM light is previously known, it is also possible to feedback-control the attenuation amount only by one quasi-signal light. In the present embodiment, the configuration of the two-way pumping light in which the pumping light is put in from both of the forward and backward of the erbium optical fiber 1 is shown, but it is also possible to put in the pumping light from either the forward or the backward. As mentioned above, in the case where a semiconductor optical amplifier is used for the optical amplifier, it is sufficient to control the injection current to the semiconductor optical amplifier element.

The basic configuration of configuring optical amplifier equipment of the present invention is described above, and as previously described, the present invention is characterized in that the gain is monitored by using quasi-signal light, in addition to the above described basic configuration. In the present embodiment, first, quasi-signal light sources 16a, 16b are provided, which output two quasi-signal lights, that is, a quasi-signal light having a wavelength still shorter than the wavelength of the signal light having the shortest wavelength among the original signal light (first quasi-signal light) and a quasi-signal light having a wavelength still longer than the longest wavelength (second quasi-signal light), respectively. Then, these quasi-signal lights are wavelength-division-multiplexed with the WDM light by WDMs 18a, 18b arranged in the communication passages, respectively.

The WDM light to which the quasi-signal light is wavelength-division-multiplexed is put in the optical fiber amplifier to be optically amplified, and it is outputted as the amplified WDM light. Between the optical fiber amplifier and the above described optical branching unit 5 for monitoring the optical output level, a variable optical attenuator 4 and wavelength division multiplexers 20a, 20b are arranged, respectively. The wavelength division multiplexers 20a, 20b branch and take out the amplified first quasi-signal light and second quasi-signal light from among the amplified WDM light, respectively. The branched first and second post-amplification quasi-signal lights are received by optical receivers 9a, 9b, respectively, and optical output levels are detected. The optical output levels of the first and second quasi-signal lights which are detected here are outputted to a variable optical attenuator (variable ATT) drive control circuit 12, and an attenuation amount corresponding to the difference between both optical output levels is set, and this attenuation amount is given to the amplified WDM light by the variable optical attenuator 4.

In the present embodiment, the configuration using an optical amplifier of one-stage is described. The configuration using an optical amplifier of the one-stage configuration is considered to be applied, for example, in the case where the number of multiplexed wavelengths is small and the total optical output of the outputted WDM light is also small. In the case where the wavelength band is narrow, the gain equalizer is unnecessary if a time when the wavelength characteristic of the gain of the optical fiber amplifier is flat is used, but even in such a case, the flatness of the gain in the desired wavelength band can be realized only at one point of a certain gain value.

Figure 3:
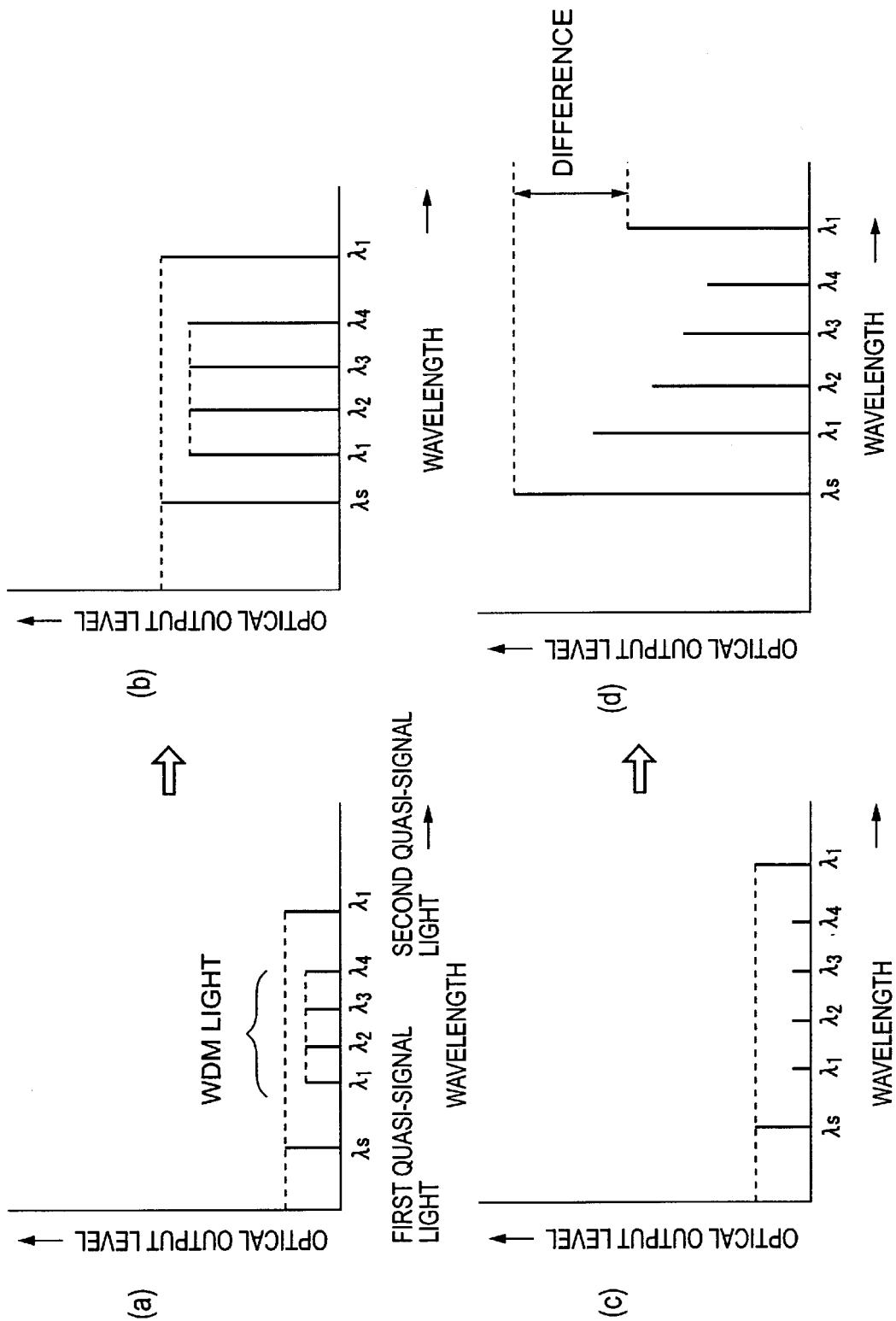
FIG. 3 is a view showing the relation between the wavelengths of the WDM signal light and the quasi-signal light and the optical input output level in optical amplifier equipment for WDM optical communication of the present invention, and 3(a) is a view showing the optical input level in the initial state, and 3(b) is a view showing the optical output level after the optical amplification in the state of 3(a), and 3(c) is a view showing the optical input level in the case where the optical input level of the WDM light is lowered, and 3(d) is a view showing the optical output level after the optical amplification in the state of 3(c)

Here, in order to make the basic principle of the present invention more understandable, the relation of the optical output levels before and after the optical amplification of the WDM light and the quasi-signal light will be described by referring to FIG. 3. In FIG. 3, FIG. 3(a) typically shows the relation between the wavelengths $\lambda 1$ to $\lambda 4$ of each signal lights included in the wavelength-division-multiplexed WDM light and the optical input level, and the relation between the wavelengths $\lambda s$, $\lambda l$ of the first and second quasi-signal lights and the optical input level, respectively. Here, in order to make it understandable, a case of 4 wavelengths is taken as an example.

FIG. 3(c) shows a state of the WDM light optically amplified by the optical amplifier, and in the case where the optical amplification is performed at a specific gain, that is, at a gain where the gain flatness of the optical amplifier is kept (hereafter, referred to as "reference gain"), the relative relation of the level of each signal light included in the WDM light is kept. The relation of the levels of the first and second quasi-signal lights is also kept, and for example, when the level before the optical amplification is the same, the level must also be kept at same level after the optical amplification. In the optical amplifier equipment of the present invention, the optical output control is performed so that the optical output level may be kept at a specific value, and accordingly, the total optical output level of the WDM light ($\lambda 1$ to $\lambda 4$) is controlled so that it may be a specific value.

FIG. 3(c) shows a case where the optical input level of the WDM light is lowered. In this case, the optical input levels of the first and second quasi-signal lights are also set similarly to FIG. 3(a). FIG. 3(d) is a view showing the optical output level in the case where the WDM light in the state of FIG. 3(c) is optically amplified. Since the optical output control is performed, the control is performed so that the total optical output level of the WDM light may be kept, and a gain higher than that in the case of the state of FIG. 3(a) is imposed on the optical amplifier. As a result of this, a wavelength dependence occurs in the gain, and for example, if there is such a characteristic that the light with a shorter wavelength has a larger gain as the gain becomes higher, as shown in the figure, the optical output level of each signal light becomes lower as the wavelength changes to a longer wavelength from the wavelength $\lambda 1$ to the wavelength $\lambda 4$, and the gain flatness is broken.

At this moment, the optical output levels of the first quasi-signal light and the second quasi-signal light also relatively change at the same time, and a difference occurs, and therefore, if this difference is made to be kept in the original state shown in FIG. 3(b), the reference gain is kept as a result. In the optical amplifier equipment of the present invention, such a control is performed by controlling the attenuation amount thereof by using a variable optical attenuator. According to the example described here, the attenuation amount added in the initial state should be reduced.

Next, the optical output level control for keeping the optical output level of the amplified WDM light constant, the difference of the optical output levels of the quasi-signal lights detected as described above, and operation of the optical attenuation control of the amplified WDM light performed based on this will be described.

Figure 4:
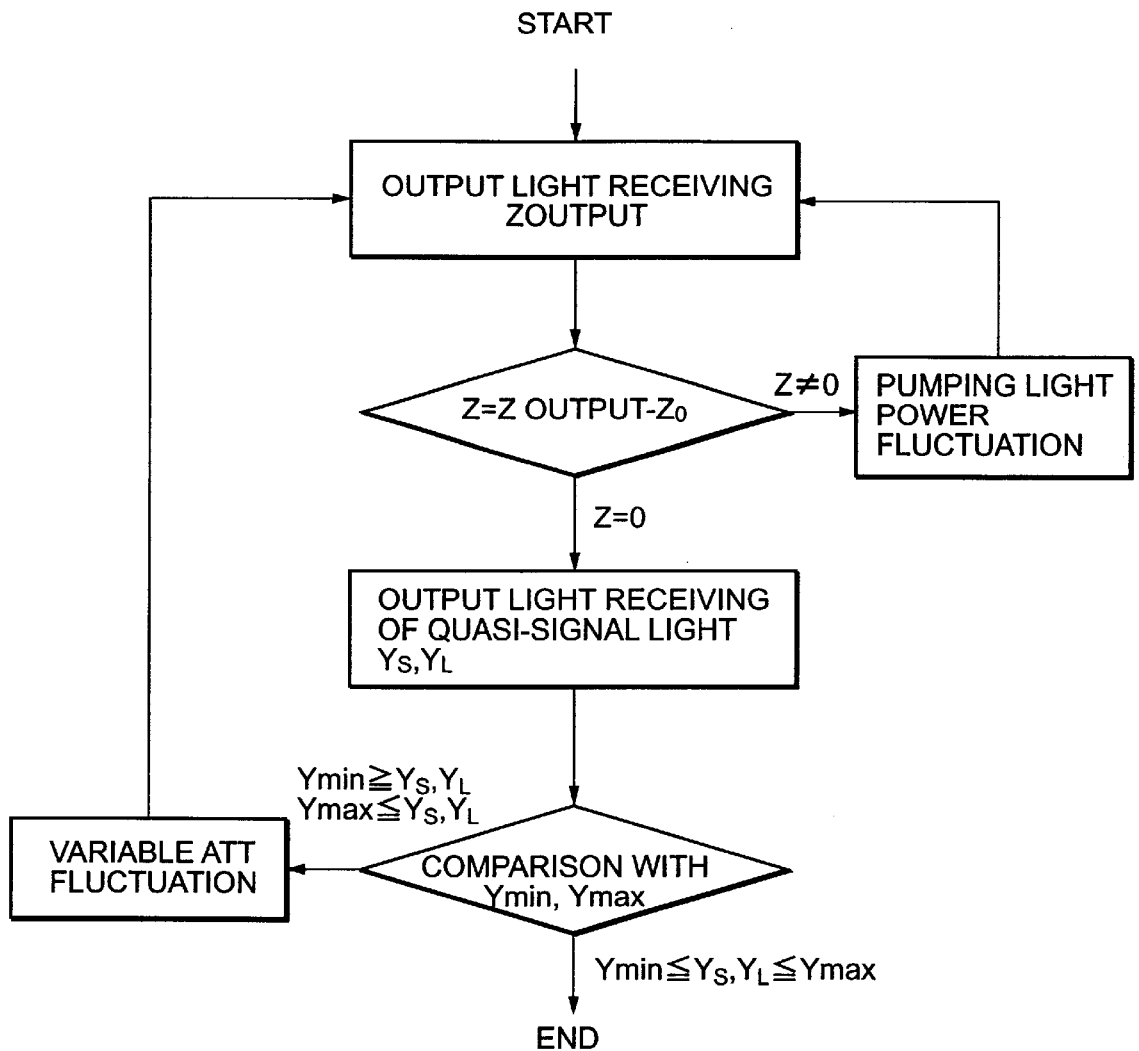
FIG. 4 is a view showing the flow of control of the output level of the signal light by the quasi-signal light in optical amplifier equipment for WDM optical communication of the present invention.

FIG. 4 is a view showing the flow of control of the output level of the signal light by the quasi-signal light in optical amplifier equipment for WDM optical communication of the present invention. First, in a control circuit 10, the current outputted from the optical receiver 8 is converted into the voltage signal, and the optical output level (Zout) of the WDM light is detected, and by the comparison with the reference voltage (Z0) set from the external information, the drive current of the pumping light sources 7a, 7b is controlled so that the signal light may be outputted at a desired value (controlled to keep Z=0). By this control, first, the optical output level of the amplified WDM light outputted from the optical fiber amplifier is controlled to be constant. Here, if the gain given by the optical fiber amplifier is the reference gain, a desired gain flatness can be obtained, and each signal light outputted from the optical amplifier equipment is outputted to the communication passage at the rear stage while keeping the relation before the optical amplification.

Figure 5:
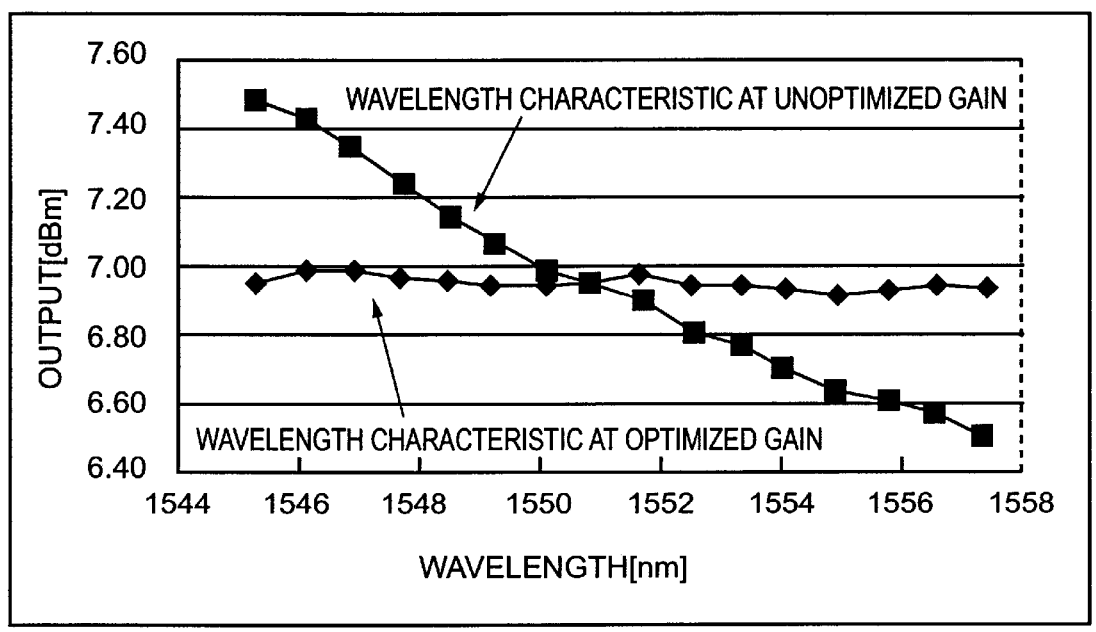
FIG. 5 is a view showing the relation between the wavelength of the signal light and the output (gain) in each of the case where the optimization is performed and the case where the optimization is not performed, in optical amplifier equipment for WDM optical communication of the present invention.

However, if the control is only the above described optical output level constant control, it only means that the wavelength-division-multiplexed signal light is controlled to a desired output value corresponding to the number of wavelengths, and the wavelength characteristic of the gain for each signal light with each wavelength is not controlled at all. As a result of that, in the case where the optical input level of the inputted WDM light fluctuates, or in the case where the gain of the optical fiber amplifier itself fluctuates because of the fluctuation of the insertion loss of an optical part configuring the optical fiber amplifier A, the control is performed so that the optical output level may be kept constant. Therefore, the gain already deviates from the initial gain, that is, the gain at which the gain flatness is assured, and accordingly, it is supposed that the gain flatness may be degraded (refer to FIG. 5).

Therefore, in the present embodiment, next, in the control circuit 12, the optical output levels (Ys, Yl) of the first and second quasi-signal lights outputted from the optical receivers 9a, 9b are detected, and the relative relation of both is monitored. By monitoring the optical output levels of two quasi-signal lights, the wavelength dependence of the gain produced by the optical fiber amplifier can be known, and the deviation from the reference gain can be detected. In the initial state where the flatness of the gain of the optical fiber amplifier is obtained, if the optical output levels of both post-amplification quasi-signal lights are also the same, it is sufficient to control the attenuation amount given by the variable optical attenuator so that the optical output levels of both post-amplification quasi-signal lights may be the same (Ys=Yl), even in the case where a fluctuation occurs in the optical input level.

Here, the control is performed so that the optical output levels of the first and second amplified quasi-signal lights may be the same, but if the difference to be a specific gain is known in advance, or if a deviation exists in both post-amplification quasi-signal lights in the above described initial state, the attenuation amount should be controlled to keep the original relation. Alternatively, if it is sufficient that the gain dependence within a specific range is kept, as shown in the control flow of FIG. 4, it is sufficient that the set values Ymin, Ymax of the permissible optical output levels of the post-amplification quasi-signal lights are determined and that the attenuation amount is controlled to be within a previously determined range. For example, considering that there is a variation in the manufacturing of the optical fiber amplifier or the like, a comparison is performed to see whether the output is within the range of the output in which the gain flatness is worse than the optimized gain flatness by about 0.2 dB, and when it is out of the range, the control is performed by changing the attenuation amount of the variable optical attenuator 4. By obtaining desired results both in the control circuit 10 and in the control circuit 12, the amplification of the WDM light in which the gain flatness is compensated can be realized.

Furthermore, in the case of the above described configuration, a difference between both signal lights after the amplification is calculated by using two quasi-signal lights, and the attenuation amount for the WDM light is controlled, but in the case where the correlation between the optical output level of the amplified quasi-signal light and the attenuation amount to be given to the WDM light is known in advance, it is also possible to feedback-control the attenuation amount only by one quasi-signal light. For example, in FIG. 2, it is also possible to make a configuration in which the quasi-signal light source 16b, the quasi-signal light WDM 18b, the wavelength division multiplexer 20b, and the optical receiver 9b are omitted.

Furthermore, it is also possible that the quasi-signal light is inputted and outputted in the opposite directions of the WDM light. However, in this case, the quasi-signal light WDMs 18a, 18b arranged on the output side of the EDF must be arranged at the front stage of the optical isolator, and the wavelength division multiplexers 20a, 20b arranged on the input side must be arranged at the rear stage of the optical isolator.

Next, by referring to FIG. 6, control operation of the present embodiment will be described a little more detailedly.

Figure 6:
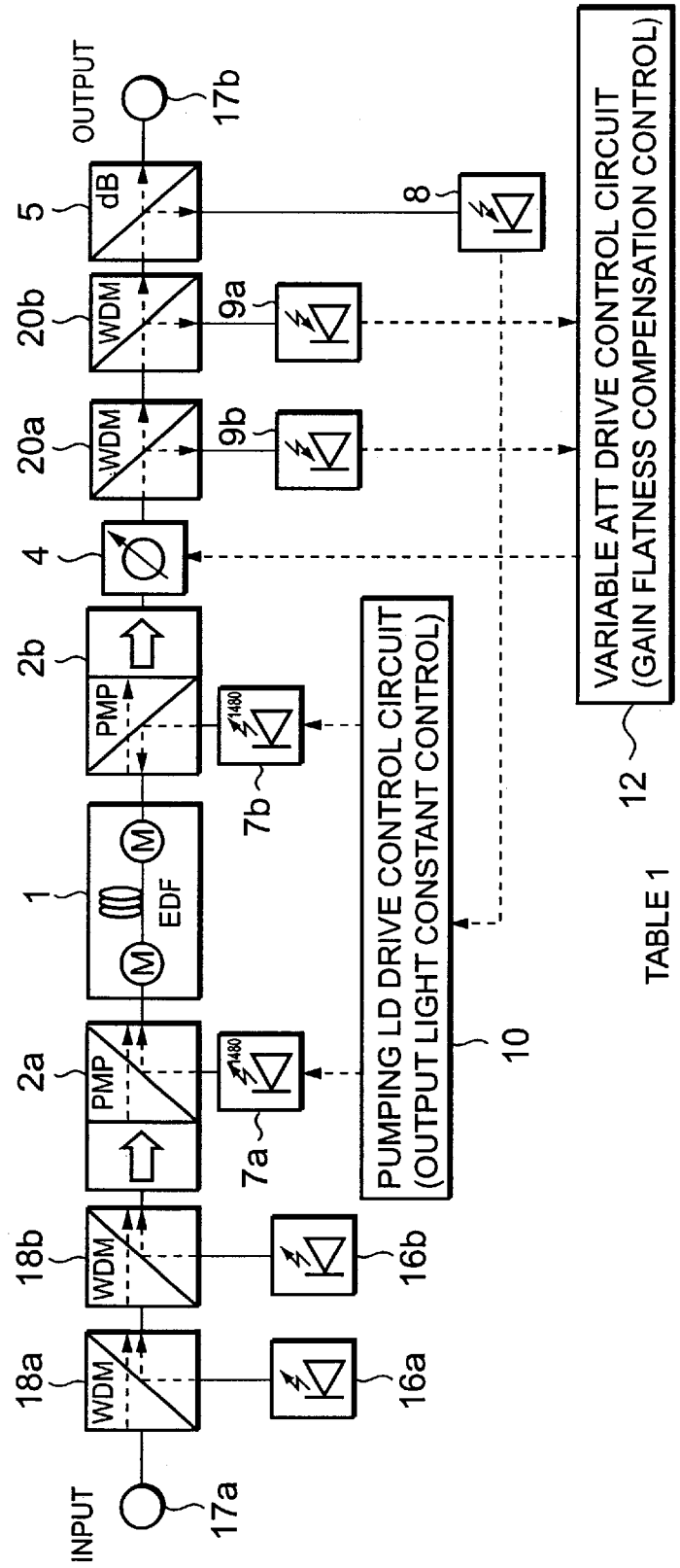
FIG. 6 is a diagram and a table for describing the control operation in the case where a fluctuation occurs in the optical input level and the loss of the optical amplifier itself, in optical amplifier equipment for WDM optical communication of the present invention.

FIG. 6 is a diagram and a table for describing the control operation in the case where a fluctuation occurs in the optical input level and the loss of the optical amplifier itself, in optical amplifier equipment for WDM optical communication of the present invention. The configuration shown in the figure is the same as the configuration of the first embodiment of the present invention shown in FIG. 2, and the optical input level of the WDM light at the optical input terminal 17a in this configuration is noted as the point A optical level, and the optical output level at the optical output terminal 17b is noted as the point B optical level.

The vertical columns in the table show the absolute optical levels at the above described point A and point B, the loss of optical parts such as an optical fiber amplifier, the attenuation amount (attenuation amount to be set) by the variable optical attenuator, and the gain of the optical fiber amplifier, from the left, respectively.

The uppermost column shows the state where the best flatness of the gain is obtained (above described initial state). In the example shown in this chart, first, the point B, that is, the set value of the optical output level to be controlled is set at +10 dBm. Accordingly, this absolute optical level is kept at all times. Then, it is supposed that a gain at which the most suitable state of the gain flatness of the optical fiber amplifier can be obtained, that is, the reference gain is, for example, 30 dB. The optical part loss fluctuates according to the variation in the manufacturing of each optical fiber amplifier or the like, and in the present example, it is 7.0 dB in the initial state.

Then, if the point A, that is, the optical input level of the WDM light is −8 dBm, the attenuation amount should be set at 5 dB, considering the compensation of the optical part loss, in order to keep the above described optical output level at +10 dBm and to keep the gain of the optical fiber amplifier at 30 dB.

The numerical values shown in the column of the second stage show those in the case where only the optical input level of the WDM light fluctuates, and the control of the attenuation amount in this case will be described, Now, it is supposed that the optical input level is increased by 2 dB and fluctuated to −6 dBm. In this case, if the standard attenuation amount is not changed at all from the initial state, the optical output level is also kept at +10 dBm, and therefore, as a result of this, the gain of the optical fiber amplifier maybe 28 dB, and the gain is lowered from the initial state. However, in this state, the wavelength dependence of the gain also fluctuates, and as a result, the relative relation of the optical output level of the signal light with each wavelength is not be kept. Therefore, in the present invention, as described above, by using the fact that a change occurs in the relative relation of the optical output level between two quasi-signal lights, the attenuation amount is given so that this relation, for example, the difference may return to the original initial state. Here, as a result, an attenuation amount of 7 dB is given.

The lowermost column shows the numerical values in the case where the optical input level is lowered and further, the optical part loss is also increased by the aging. It is assumed that the optical input level is lowered by 2 dB to −10 dBm, and that the optical part loss is increased by 2 dB from the initial state to 9 dB. Then, if the gain of the optical fiber amplifier is set at 34 dBm to keep the optical output level at +10 dBm, a change occurs in the wavelength dependence of the gain, and the relative relation of the optical output level of each signal light is broken. Therefore, in such a case, it is possible to deal with the situation without causing a fluctuation in the gain since the attenuation amount is reduced from the standard attenuation amount of 5 dB to 1 dB,. Herein, by clarifying in advance the relative relation between two quasi-signal lights, for example, the difference between both, and the fluctuation amount of the wavelength dependence itself of the gain, the attenuation amount to be set can easily be calculated.

In the above description of operation, a configuration is shown, in which the standard optical input level of the WDM light is supposed and allowance is made for the loss increased because of the aging of the optical fiber amplifier or the like and the ambient temperature or the like and the standard attenuation amount is also given in the initial state, but if allowance is not made for the fluctuation caused by the aging or the like, it is also possible that the initial state is set based on the minimum reception level and the attenuation amount at this moment is set at zero (attenuation amount like this is called "reference attenuation amount").

Next, the configurations of other embodiments of the optical amplifier equipment for WDM optical communication of the present invention will be described below.

Figure 7:
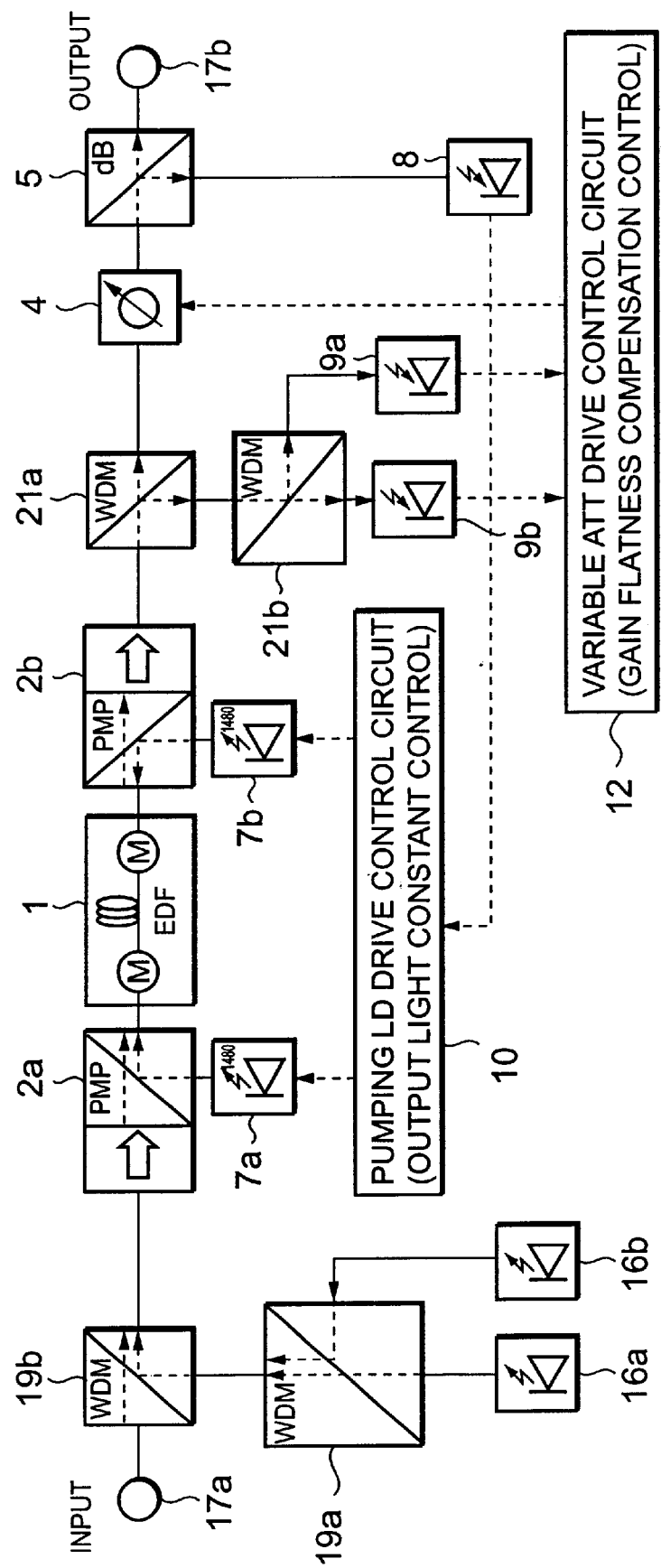
FIG. 7 is a view showing the configuration of a second embodiment of optical amplifier equipment for WDM optical communication of the present invention.

FIG. 7 is a view showing the configuration of a second embodiment of the optical amplifier equipment for WDM optical communication of the present invention.

The basic configuration having an optical fiber amplifier and a control circuit 10 for making the optical output level constant is the same as the configuration of the first embodiment. Furthermore, the configuration is also the same in that two quasi-signal lights are wavelength-division-multiplexed with the WDM light and they are optically amplified and after that, both quasi-signal lights are taken out and by the difference between the optical output levels of both, the attenuation amount of the variable optical attenuator is controlled.

In the present embodiment, first, the configuration of the wavelength division multiplexing of two quasi-signal lights and the branching of the amplified quasi-signal light is different from that of the first embodiment. In the first embodiment, a WDM and an wavelength division multiplexer corresponding to the wavelength division multiplexing and the branching of each quasi-signal light are arranged in the communication passage, but the present embodiment is different in that first, both quasi-signal lights are wavelength-division-multiplexed by a WDM 19a and this multiplexed quasi-signal lights are wavelength-division-multiplexed with the WDM light by a WDM 19b.

As for the branching of the amplified quasi-signal light, the configuration is different from the configuration of the first embodiment in that first, both amplified quasi-signal lights are branched by an wavelength division multiplexer 21a arranged in the communication passage and both branched amplified quasi-signal lights are further branched by an wavelength division multiplexer 21b. It is also possible to employ any of the combination of the configuration of the WDM of the first embodiment and the configuration of the wavelength division multiplexer of the present embodiment and the reverse combination thereof. It can be said that the present embodiment is more excellent in that the number of the WDM or the wavelength division multiplexer arranged in the communication passage can be one and the loss to the WDM light is reduced.

The present embodiment is also different from the first embodiment in the position where the variable optical attenuator is arranged. In the first embodiment, the variable optical attenuator is arranged between the optical fiber amplifier and the wavelength division multiplexer 20a for taking out the amplified quasi-signal light, but the present embodiment is different in that it is arranged between the wavelength division multiplexer 21a and the optical branching unit 5. Basically, the variable optical attenuator may be arranged at the front stage of the optical fiber amplifier as long as it is arranged at the front stage of the optical branching unit for monitoring the optical output level. However, if it is arranged at the front stage of the optical fiber amplifier, the WDM light before the optical amplification is attenuated, and therefore, it is preferably be arranged at the rear stage. In order to monitor the optical output level of the amplified quasi-signal light in a high state, it is preferable to add attenuation after the amplified quasi-signal light has been branched like the present embodiment.

Figure 8:
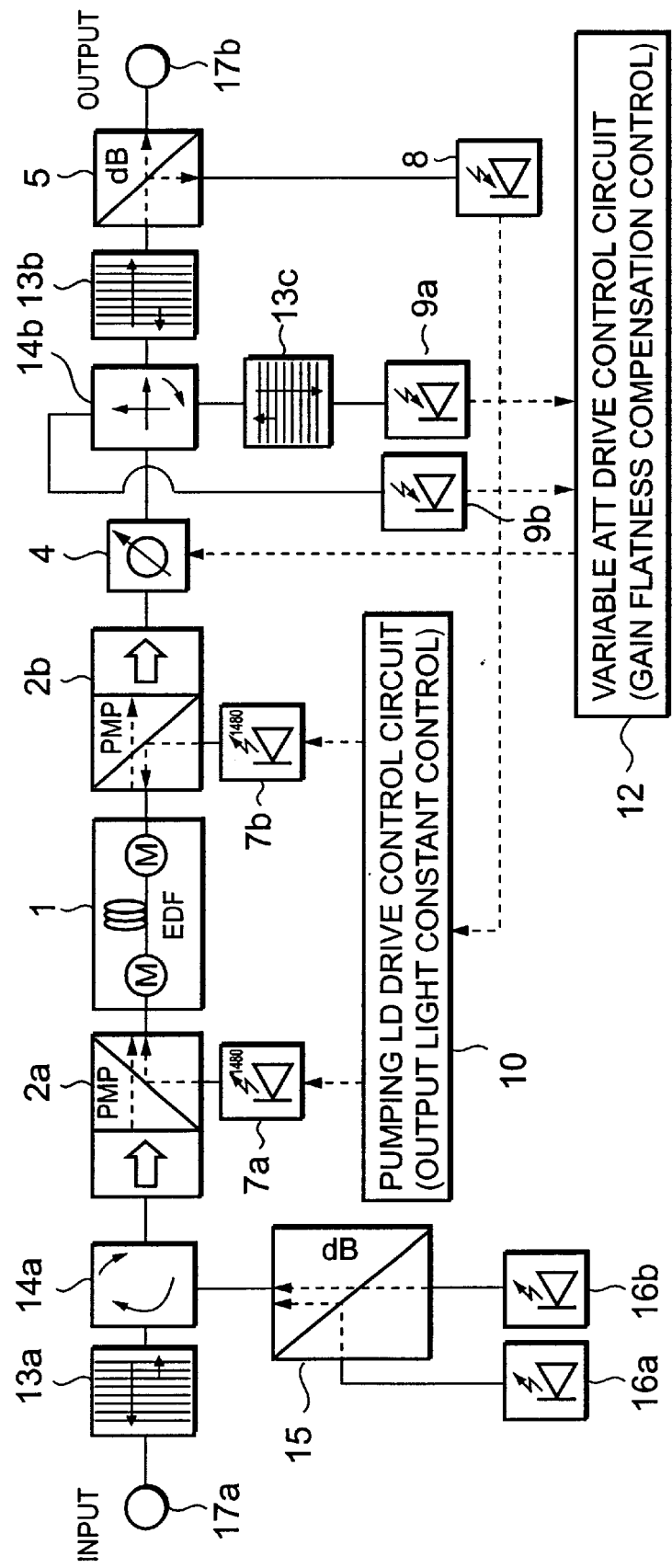
FIG. 8 is a view showing the configuration of a third embodiment of optical amplifier equipment for WDM optical communication of the present invention.

FIG. 8 is a view showing a third embodiment of the optical amplifier equipment for WDM optical communication of the present invention.

In the present embodiment, the basic configuration having an optical fiber amplifier and a control circuit 10 for making the optical output level constant is also the same as the configuration of the first embodiment. Furthermore, the configuration is also the same in that two quasi-signal lights are wavelength-division-multiplexed with the WDM light and they are optically amplified and after that, both quasi-signal lights are taken out and by the difference between the optical output levels of both, the attenuation amount of the variable optical attenuator is controlled.

In the present embodiment, an optical fiber amplifier 1, pumping light WDMs 2a, 2b, pumping light sources (for example, 1480 nm pumping LD light sources) 7a, 7b, a variable optical attenuator 4, an optical branching unit 5, optical receivers (monitor PD) 8, 9a, 9b, fiber gratings 13a, 13b, 13c, optical circulators 14a, 14b, a WDM 15, and quasi-signal light sources (LD light sources) 16a, 16b are also provided. In addition, a control circuit 10 which controls the pumping light sources 7a, 7b so that the output signal light may be constant, and a control circuit 12 which controls the variable optical attenuator 4 so that the output signal light may be within a certain range on the basis of the reception data of the optical output level of the amplified quasi-signal light detected by the PDs 9a, 9b are provided. Herein, the operation of the control is the same as that described in the first embodiment.

In the present embodiment, the configuration is different from the above mentioned configurations of the first and second embodiments in that an optical circulator and a fiber grating are used in the wavelength division multiplexing of the quasi-signal light and the branching of the amplified quasi-signal light. First, the configuration of the WDM will be described. Similarly to the second embodiment, two quasi-signal lights are wavelength-division-multiplexed by the WDM 15. Then, the multiplexed quasi-signal lights are inputted into the optical circulator 14a arranged in the communication passage, and they are outputted in the opposite direction of the traveling direction of the WDM light. The multiplexed quasi-signal lights are reflected by a quasi-signal reflector 13 and they are wavelength-division-multiplexed with the WDM light, and they are inputted into the optical fiber amplifier.

A three-port optical circulator 14a has a function to pass the light put in from the port 1 to the port 2 and to pass the light put in from the port 2 to the port 3. In the present embodiment, the lights outputted from the quasi-signal light sources 16a, 16b are wavelength-division-multiplexed in the WDM 15 and they are put in from the port 1. The signal light is put in from the port 2 and it is passed to the port 3.

In the above described configuration, a fiber grating can be used for the quasi-signal light reflector. A reflector which carries out the above described function can be configured, for example, by connecting in series a fiber grating which reflects only the first quasi-signal light and passes the second quasi-signal light and the WDM light, and a fiber grating which reflects only the second quasi-signal light and passes the first quasi-signal light and the WDM light. Alternatively, it is also possible to use a chirped fiber grating which has a characteristic to reflect the first and second quasi-signal lights and to pass the WDM light in the wavelength band between them.

Herein, the fiber grating is a substance in which the refractive index of the core portion of the optical fiber is changed by a constant cycle, and it has an action to reflect only the light with a specific wavelength selectively. That is, the fiber gratings 13a, 13b used in the present embodiment have a characteristic to pass the multiplexed wavelength band and to reflect only the wavelengths of the LD light sources 16a, 16b, and the fiber grating 13c has a characteristic to pass only the wavelength of the LD light source 16a and to reflect only the wavelength of the LD light source 16b.

Next, the wavelength division multiplexer will be described. It is set that first, the amplified WDM light including the quasi-signal light can be passed by a four-port circulator 14b arranged in the communication passage. Then, by the quasi-signal reflector 13b arranged at the rear stage thereof, only both post-amplification quasi-signal lights are reflected. The amplified WDM light made of the original signal light is passed to the optical branching unit 5, as it is. Both reflected post-amplification quasi-signal lights are inputted into the optical circulator 14b again, and this time, they are outputted to the port where the fiber grating 13c is arranged. One post-amplification quasi-signal light is passed to be received by the optical receiver 9a, and the other is reflected and the other reflected light is further received by the optical receiver 9b through the optical circulator 14b.

Herein, the four-port optical circulator 14b is an optical circulator having a function similar to that of the three-port optical circulator previously described in the third embodiment and having four input output ports.

Like the present embodiment, if the wavelength division multiplexing and the branching are performed by the fiber grating, they are more suitable than those performed by a WDM using an interference film filter or the like, when the quasi-signal light is close to the original signal light. The reflector 13b can also employ a configuration similar to that of the above described reflector 13a.

Figure 9:
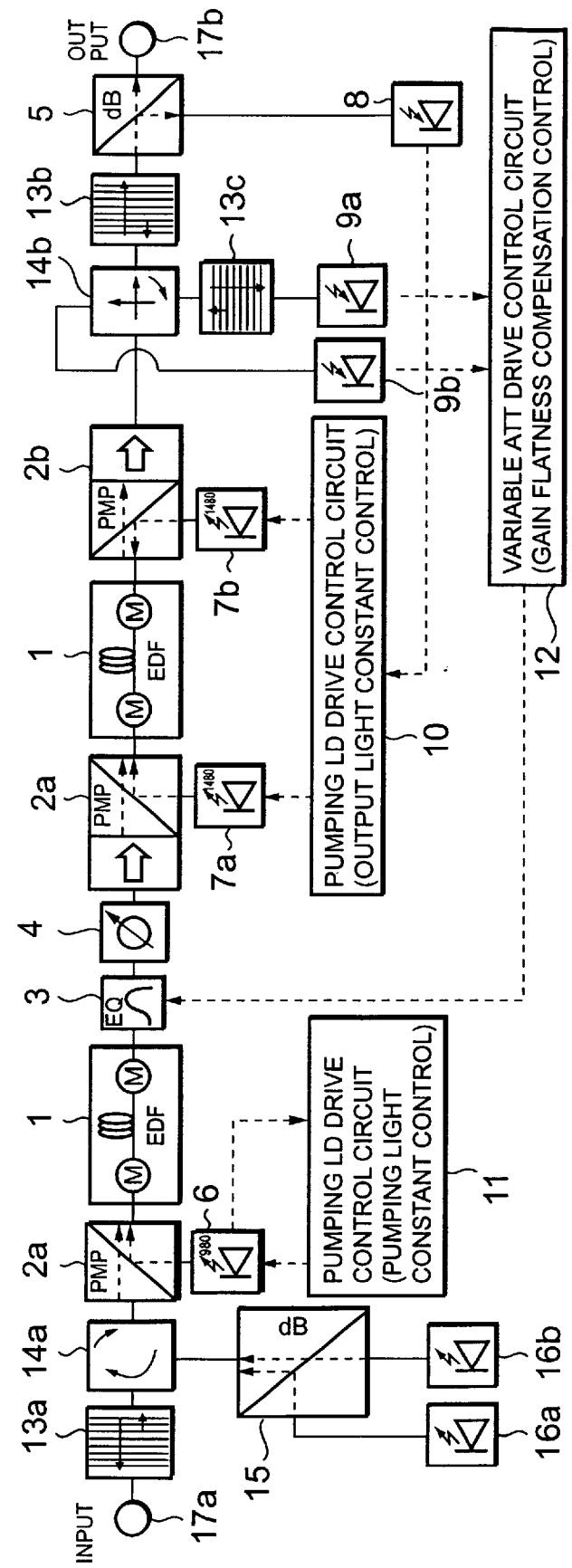
FIG. 9 is a view showing the configuration of a fourth embodiment of optical amplifier equipment for WDM optical communication of the present invention.

FIG. 9 is a view showing the configuration of a fourth embodiment of the optical amplifier equipment for WDM optical communication of the present invention.

In the present embodiment, the basic configuration having an optical fiber amplifier and a control circuit 10 for making the optical output level constant is also the same as the configuration of the third embodiment. Furthermore, a similar configuration is used in the control circuit in which after two quasi-signal lights have been wavelength-division-multiplexed with the WDM light and they have been optically amplified, both quasi-signal lights are taken out and by the difference between the optical output levels of both, the attenuation amount of the variable optical attenuator is controlled, and the wavelength division multiplexing and the branching of the quasi-signal light.

In all of the previously described first to fourth embodiments, a single optical fiber amplifier is used. By contrast, in the present embodiment, an optical fiber amplifier with the two-stage configuration is used, which has a first optical fiber amplifier and a second optical fiber amplifier which is additionally connected in series at the front stage thereof. In the present embodiment, in order to compensate the flatness of the gain in the initial state, a gain equalizer 3 is used. The gain equalizer 3 is an optical part having a wavelength characteristic of loss which is the reverse of the wavelength characteristic of gain of the optical fiber amplifiers 1a, 1b, and the optimized gain flatness can be obtained only at one point of the gain value.

That is, in the first embodiment or the like, a gain at which a desired gain flatness can be obtained as a result is selectively set, and the standard attenuation amount is set on the basis of this. On the other hand, in the present embodiment, together with the optical output level of the WDM light optically amplified by the optical amplifier equipment, the gain of the total of the optical amplifier equipment (in the case of the present embodiment, the total gain by the two-stage optical fiber amplifier equipment) is also set at a specific gain, that is, the reference gain, and the wavelength dependence of the gain caused at this moment is previously flattened by arranging the gain equalizer 3 in advance.

Making this state the initial state, the standard attenuation amount is calculated from the optical output level, the reference gain, and the optical part loss or the like, and this is added as the standard attenuation amount. Then, the attenuation amount is controlled so that the gain may be kept at the reference gain at all times even in the case where the optical output level or the optical part loss fluctuates. In the present embodiment, the control is performed so that the output of the pumping light outputted from the pumping light sources 7a, 7b of the second optical fiber amplifier may be constant, and consequently, the gain of the second optical fiber amplifier is controlled to be constant.

Herein, in the present embodiment, as shown in FIG. 9, the gain equalizer 3 is arranged between the first and second optical fiber amplifiers. However, it is sufficient that the gain equalizer 3 finally has an equalizing action of the gain of the WDM light, and therefore, it can be positioned not only at the above described position but also at the rear stage of the first optical fiber amplifier or at other positions. Needless to say, this gain equalizer may be applied in the case where a single optical amplifier is used similarly to the previously described first to third embodiments.

Next, the configuration of each portion in the fourth embodiment will be described by using a more concrete example.

In the pumping light sources 6, 7a, 7b in the fourth embodiment, a high power semiconductor laser diode is used for pumping the optical fiber amplifiers 1a, 1b. In order to realize low noise, an InGaAs laser diode with an oscillating wavelength of 980 nm is used for the pumping light source 6, and in order to realize high power, an InGaAsP/InP laser diode with an oscillating wavelength of about 1480 nm is used for the pumping light sources 7a, 7b.

The optical isolators arranged at the front and rear stages of the pumping light WDMs 2b, 2c are isolators which pass the light only in one direction, and they exist for eliminating the effect caused by the reflection. The pumping light WDMs 2a, 2b, 2c are WDMs which wavelength-division-multiplex the lights with different wavelengths, and in the present embodiment, the pumping light WDM 2a wavelength-division-multiplexes and outputs the pumping light source of the 980 nm band and the WDM light, and the pumping light WDM 2b and 2c multiplex and output the pumping light source of the 1480 nm band and the WDM light.

As for the optical branching unit 5, the amplified WDM light is branched by the optical branching unit 5, and in the present embodiment, the branched light of about 5% is branched to the optical receiver 8 side for monitoring the optical output level of the amplified WDM light. The residual light of 95% is outputted from an optical connector 17b as the WDM light.

As described above, not only the optical fiber amplifier equipment for WDM optical communication of the present invention receives the branched output light by the monitor PD and performs the output constant control, but also it wavelength-division-multiplexes the quasi-signal light having wavelengths on the short wave side or the long wave side of the wavelength band of the original signal light to be multiplexed, with the signal light and optically amplifies the light and monitors the output thereof. Consequently, the wavelength characteristic in the wavelength band of the signal light can be controlled. Even if a change in the insertion loss is caused by the variation of manufacturing of the optical parts configuring the optical fiber amplifier or by the change of the environmental temperature, the gain flatness through the wavelength-division-multiplexed signal light can be kept constant without fluctuating the gain of the optical fiber amplifier, by controlling the variable optical attenuator.

The loss amount of the variable optical attenuator is set considering in advance the fluctuation amount of the signal light to be inputted, and consequently, even when the input power is small, it is possible to make the gain of the optical fiber amplifier unchangeable by fluctuating the loss amount of the variable optical attenuator by an amount corresponding thereto.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. Optical amplifier equipment for WDM optical communication, comprising:
   a first optical amplifier into which WDM light made by wavelength-division-multiplexing a plurality of signal lights with mutually different wavelengths is inputted and which optically amplifies the WDM light and outputs amplified WDM light;
   an optical output level control circuit which includes an optical branching unit for branching part of said amplified WDM light, and which monitors said amplified WDM light branched by the optical branching unit to control said first optical amplifier so that an optical output level of the amplified WDM light may be kept at an optical output level of a previously determined value (hereafter, referred to as "reference optical output level");
   a quasi-signal light WDM which wave-length-multiplexes a first quasi-signal light and a second quasi-signal light having wavelengths different from a wavelength of said signal light and having mutually different wavelengths with said WDM light and inputs the light into said first optical amplifier;
   a post-amplification quasi-signal light detector circuit which takes said first amplified quasi-signal light (hereafter, referred to as "first post-amplification quasi-signal light") and said second amplified quasi-signal light (hereafter, referred to as "second post-amplification quasi-signal light") out of said amplified WDM light and which detects optical output levels of said first post-amplification quasi-signal light and said second post-amplification quasi-signal light, respectively and which outputs a level of said first post-amplification quasi-signal light and a level of said second post-amplification quasi-signal light; and
   a variable optical attenuator which calculates a difference between a level of said first post-amplification quasi-signal light and a level of said second post-amplification quasi-signal light, and which gives an attenuation amount determined on the basis of said difference to said WDM light.

2. The optical amplifier equipment for WDM optical communication according to claim 1, wherein said quasi-signal light WDM is arranged on the input side of said optical amplifier.

3. The optical amplifier equipment for WDM optical communication according to claim 2, wherein
   said first quasi-signal light has a wavelength shorter than that of a signal light with the shortest wavelength among said signal light, and
   said second quasi-signal light has a wavelength longer than that of a signal light with the longest wavelength among said signal light.

4. The optical amplifier equipment for WDM optical communication according to claim 3, wherein said variable optical attenuator is arranged on the input side of said first optical amplifier.

5. The optical amplifier equipment for WDM optical communication according to claim 4, wherein
   said WDM light to which a specific attenuation amount is given by said variable optical attenuator is post-amplification WDM light outputted from said first optical amplifier, and
   said variable optical attenuator includes a variable optical attenuator arranged between said first optical amplifier and said optical branching unit.

6. The optical amplifier equipment for WDM optical communication according to claim 5, further comprising a gain equalizer which gain-equalizes each of said signal light so that a gain for each of said signal light included in said amplified WDM light may be uniform, in a case where a gain of said amplified WDM light optically amplified by said first optical amplifier is a gain of a previously determined value (hereafter, referred to as "reference gain").

7. The optical amplifier equipment for WDM optical communication according to claim 6, wherein said gain equalizer is arranged on the input side of said first optical amplifier.

8. The optical amplifier equipment for WDM optical communication according to claim 7, wherein said gain equalizer is arranged on the output side of said first optical amplifier.

9. The optical amplifier equipment for WDM optical communication according to claims 4, wherein
   setting is made so that a gain at the time when said WDM light is optically amplified to said reference optical output level by said first optical amplifier may be said reference gain, when said WDM light of a previously determined level is inputted into said optical amplifier equipment for WDM optical communication (hereafter, referred to as "when a standard level is received"), and
   said attenuation amount is set at an attenuation amount of a previously determined value (hereafter, referred to as "standard attenuation amount") at said time when a reference level is received.

10. The optical amplifier equipment for WDM optical communication according to claim 6, wherein
    setting is made so that a gain at the time when said WDM light is optically amplified to said reference optical output level by said first optical amplifier may be said reference gain, when said WDM light of a minimum level is inputted into said optical amplifier equipment for WDM optical communication (hereafter, referred to as "when a minimum level is received"), and setting is made so that said attenuation amount may be zero at said time when a minimum level is received.

11. The optical amplifier equipment for WDM optical communication according to claim 2, wherein
said first optical amplifier is an optical fiber amplifier comprising:
a first amplifying optical fiber which is an amplifying medium of said WDM light;
a first pumping light source which outputs a first pumping light; and
a first pumping light WDM which wavelength-division-multiplexes said first pumping light and inputs the first pumping light into said first amplifying optical fiber, and
said optical output level control circuit includes a first pumping light output control circuit which controls an optical output level of said first pumping light.

12. The optical amplifier equipment for WDM optical communication according to claim 2, wherein
said first optical amplifier is a semiconductor optical amplifier including a first semiconductor optical amplifier element which optically amplifies said WDM light, and
said optical output level control circuit includes a first injection current control circuit which performs a control so that a gain of said first semiconductor optical amplifier element may be constant.

13. The optical amplifier equipment for WDM optical communication according to claim 6, further comprising a second optical amplifier which is arranged between said quasi-signal light WDM and said first optical amplifier, and which optically amplifies said WDM light and outputs the WDM light to said first optical amplifier.

14. The optical amplifier equipment for WDM optical communication according to claim 13, wherein said gain equalizer is arranged between said second optical amplifier and said first optical amplifier.

15. The optical amplifier equipment for WDM optical communication according to claim 13, wherein said gain equalizer is arranged on the output side of said first optical amplifier.

16. The optical amplifier equipment for WDM optical communication according to claim 13, wherein said gain equalizer is arranged on the input side of said second optical amplifier.

17. The optical amplifier equipment for WDM optical communication according to claim 13, wherein
setting is made so that a gain at the time when said WDM light is optically amplified to said reference optical output level by said first optical amplifier and said second optical amplifier may be said reference gain, when a standard level is received, and
said attenuation amount is set at a standard attenuation amount at said time when a standard level is received.

18. The optical amplifier equipment for WDM optical communication according to claim 13, wherein
setting is made so that a gain at the time when said WDM light is optically amplified to said reference optical output level by said first optical amplifier and said second optical amplifier may be said reference gain when a minimum level is received, and
setting is made so that said attenuation amount may be zero when a minimum level is received.

19. The optical amplifier equipment for WDM optical communication according to claim 13, wherein
said first optical amplifier is an optical fiber amplifier comprising:
a first amplifying optical fiber which is an amplifying medium of said WDM light;
a first pumping light source which outputs a first pumping light; and
a first pumping light WDM which wavelength-division-multiplexes said first pumping light and inputs the first pumping light into said first amplifying optical fiber, and
said optical output level control circuit includes
a first pumping light output control circuit which controls an optical output level of said first pumping light.

20. The optical amplifier equipment for WDM optical communication according to claim 13, wherein
said first optical amplifier is a semiconductor optical amplifier including a first semiconductor optical amplifier element which optically amplifies said WDM light, and
said optical output level control circuit includes a first injection current control circuit which performs a control so that a gain of said first semiconductor optical amplifier element may be constant.

21. The optical amplifier equipment for WDM optical communication according to claim 13, wherein
said second optical amplifier is an optical fiber amplifier comprising:
a second amplifying optical fiber which is an amplifying medium of said WDM light;
a second pumping light source which outputs a second pumping light; and
a second pumping light WDM which wavelength-division-multiplexes said second pumping light with said WDM light and inputs the second pumping light into said second amplifying optical fiber, and further comprising
a pumping light control circuit which keeps an output of said second pumping light constant.

22. The optical amplifier equipment for WDM optical communication according to claim 13, wherein said second optical amplifier is a semiconductor optical amplifier including a second semiconductor optical amplifier element which optically amplifies said WDM light.

23. The optical amplifier equipment for WDM optical communication according to claim 2, wherein said quasi-signal light WDM comprises:
a first quasi-signal light source which outputs said first quasi-signal light;
a second quasi-signal light source which outputs said second quasi-signal light;
a first WDM which wavelength-division-multiplexes said first quasi-signal light with said WDM light; and
a second WDM which wavelength-division-multiplexes said second quasi-signal light with said WDM light.

24. The optical amplifier equipment for WDM optical communication according to claim 2, wherein said quasi-signal light WDM comprises:
a first quasi-signal light source which outputs said first quasi-signal light;
a second quasi-signal light source which outputs said second quasi-signal light;
a third WDM which wavelength-division-multiplexes said first quasi-signal light and said second quasi-signal light and outputs wavelength-division-multiplexed quasi-signal light; and
a fourth WDM which wavelength-division-multiplexes said wavelength-division-multiplexed quasi-signal light with said WDM light.

25. The optical amplifier equipment for WDM optical communication according to claim 2, wherein said quasi-signal light WDM comprises:
- a first quasi-signal light source which outputs said first quasi-signal light;
- a second quasi-signal light source which outputs said second quasi-signal light;
- a third WDM which wavelength-division-multiplexes said first quasi-signal light and said second quasi-signal light and outputs wavelength-division-multiplexed quasi-signal light;
- a first optical circulator which put in light outputted from said third WDM in the opposite direction of the traveling direction of said WDM light, and which passes light traveling in the same direction as said WDM light toward said first optical amplifier; and
- a quasi-signal light reflector which reflects only a first light with the same wavelength as said first quasi-signal light and a second light with the same wavelength as said second quasi-signal light among light outputted from said third WDM and traveling in the opposite direction of that of said WDM light, and which passes residual light.

26. The optical amplifier equipment for WDM optical communication according to claim 25, wherein said quasi-signal light reflector comprises:
- a first fiber grating which reflects only said first light and passes residual light; and
- a second fiber grating which is connected to said first fiber grating in series, and which reflects only said second light and passes residual light.

27. The optical amplifier equipment for WDM optical communication according to claim 25, wherein said quasi-signal light reflector comprises a chirped fiber grating which reflects said first light and said second light and which passes said WDM light.

28. The optical amplifier equipment for WDM optical communication according to claim 1, wherein said post-amplification quasi-signal light detector circuit includes:
- a first wavelength division multiplexer which branches said first post-amplification quasi-signal light from said amplified WDM light;
- a second wavelength division multiplexer which branches said second post-amplification quasi-signal light from said amplified WDM light;
- a first optical receiver which detects a level of said first branched post-amplification quasi-signal light and outputs a level of said first quasi-signal light; and
- a second optical receiver which detects a level of said second branched post-amplification quasi-signal light and outputs a level of said second quasi-signal light.

29. The optical amplifier equipment for WDM optical communication according to claim 2, wherein said post-amplification quasi-signal light detector circuit includes:
- a first wavelength division multiplexer which branches and takes out said first post-amplification quasi-signal light and said second post-amplification quasi-signal light from said amplified WDM light;
- a second wavelength division multiplexer which further branches said first branched post-amplification quasi-signal light and said second branched post-amplification quasi-signal light into said first post-amplification quasi-signal light and said second post-amplification quasi-signal light;
- a first optical receiver which detects a level of said first branched post-amplification quasi-signal light and outputs a level of said first quasi-signal light; and
- a second optical receiver which detects a level of said second branched post-amplification quasi-signal light and outputs a level of said second quasi-signal light.

30. The optical amplifier equipment for WDM optical communication according to claim 2, wherein said post-amplification quasi-signal light detector circuit includes:
- a second optical circulator which is an optical circulator having a four-port input-output terminal with a first port to a fourth port and outputting inputted light to a next port in an order of said first port to fourth port in turn, and in which the first port is connected to the output side of said first optical amplifier and the second port is connected to said optical branching unit;
- a post-amplification quasi-signal light reflector which is arranged between said second port and said optical branching unit and which reflects only said first post-amplification quasi-signal light and said second post-amplification quasi-signal light;
- a third fiber grating which is connected to said third port, and which passes only either said first post-amplification quasi-signal light or said second post-amplification quasi-signal light and reflects the other;
- a third optical receiver which detects a level of light passing through said fiber grating; and
- a fourth optical receiver which detects a level of light outputted from said fourth port.

31. The optical amplifier equipment for WDM optical communication according to claim 2, wherein said post-amplification quasi-signal light reflector circuit includes:
- a fourth fiber grating which reflects only said first post-amplification quasi-signal light and passes residual light; and
- a fifth fiber grating which is connected to said fourth fiber grating in series, and which reflects only said second post-amplification quasi-signal light and passes residual light.

32. The optical amplifier equipment for WDM optical communication according to claim 2, wherein said post-amplification quasi-signal light reflector includes a chirped fiber grating which reflects only said first post-amplification quasi-signal light and said second post-amplification quasi-signal light and which passes said amplified WDM light.

33. Optical amplifier equipment for WDM optical communication, comprising:
- a first optical amplifier into which WDM light made by wavelength-division-multiplexing a plurality of signal lights with mutually different wavelengths is inputted, and which optically amplifies the WDM light and outputs amplified WDM light;
- an optical output level control circuit which includes an optical branching unit for branching part of said amplified WDM light, and which monitors said amplified WDM light branched by the optical branching unit to control said first optical amplifier so that an optical output level of the amplified WDM light may be kept at an optical output level of a previously determined value (hereafter, referred to as "reference optical output level");
- a quasi-signal light WDM which wave-length-multiplexes at least one quasi-signal light having a wavelength different from a wavelength of said signal light and having mutually different wavelengths with said WDM light and inputs the light into said first optical amplifier;
- a post-amplification quasi-signal light detector circuit which takes at least one said amplified quasi-signal light out of said amplified WDM light and which detects an optical output level of at least one said post-amplification quasi-signal light and which outputs a level of the quasi-signal light; and a variable optical attenuator which gives an attenuation amount determined on the basis of a level of at least one the post-amplification quasi-signal light to said WDM light.

34. The optical amplifier equipment for WDM optical communication according to claim 33, wherein at least one said quasi-signal light has a wavelength shorter than that of a signal light with the shortest wavelength among said signal lights.

35. The optical amplifier equipment for WDM optical communication according to claim 33, wherein at least one said quasi-signal light has a wavelength longer than that of a signal light with the longest wavelength among said signal lights.

36. The optical amplifier equipment for WDM optical communication according to claim 33, wherein said variable optical attenuator is arranged on the input side of said first optical amplifier.

37. The optical amplifier equipment for WDM optical communication according to claim 36, wherein said WDM light to which a specified attenuation amount is given by said variable optical attenuator is post-amplification WDM light outputted from said first optical amplifier, and said variable optical attenuator includes a variable optical attenuator arranged between said first optical amplifier and said optical branching unit.

38. The optical amplifier equipment for WDM optical communication according to claim 36, further comprising a gain equalizer which gain-equalizes each said signal light so that a gain for each said signal light included in said amplified WDM light may be uniform, in the case where a gain of said amplified WDM light optically amplified by said first optical amplifier is a gain of a previously determined value (hereafter, referred to as "reference gain").

* * * * *